UNITED STATES PATENT OFFICE.

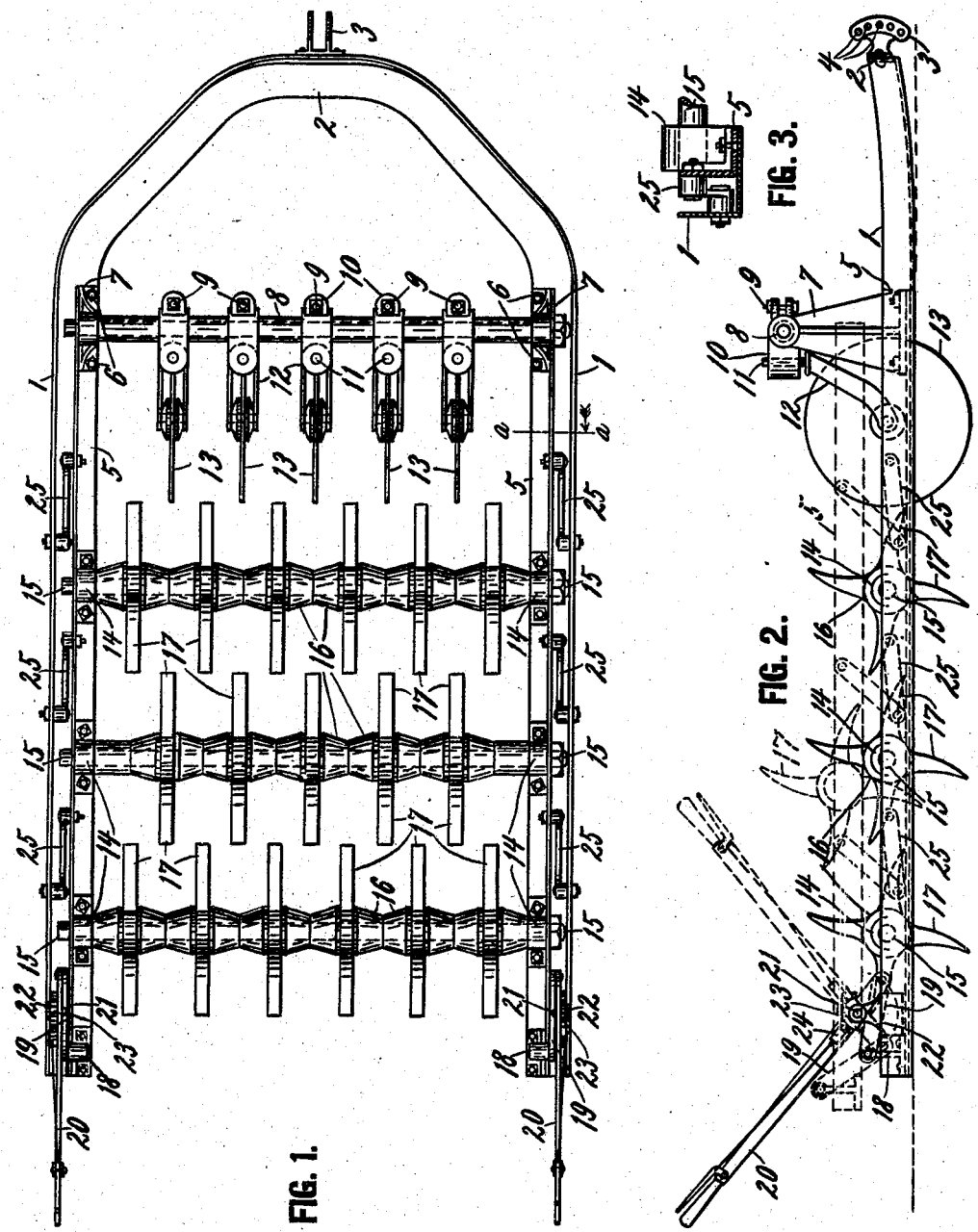

HANS P. BRUAAS, OF BALDWIN, WISCONSIN, ASSIGNOR OF ONE-EIGHTH TO S. S. HOLMES, ONE-EIGHTH TO C. B. SWENSON, ONE-EIGHTH TO JOHN E. HANSON, ONE-EIGHTH TO JOHN O. WILFORD, AND ONE-EIGHTH TO E. B. KINNEY, OF BALDWIN, WISCONSIN.

REVOLVING CULTIVATOR AND HARROW.

No. 894,939.      Specification of Letters Patent.      Patented Aug. 4, 1908.

Application filed September 5, 1907. Serial No. 391,428.

*To all whom it may concern:*

Be it known that I, HANS P. BRUAAS, a citizen of the United States, residing at Baldwin, in the county of St. Croix and State of Wisconsin, have invented a new and useful Revolving Cultivator and Harrow, of which the following is a specification.

My invention relates to improvements in agricultural implements of the class drawn by horses or other animals for cutting and pulverizing the surface of the soil, as in cultivating, weeding, harrowing etc., for all of which purposes my device may be used, and it may be called a combined rolling cultivator and harrow.

In the accompanying drawing Figure 1 is a top or plan view of my improved implement. Fig. 2 is a side elevation of Fig. 1 with some of the parts shown also as elevated in dotted lines. Fig. 3 is a cross section on the line *a—a* in Fig. 1.

Referring to the drawing by reference numerals, 1—1 designate two runners made of angle-steel and united at the front by an arched cross-bar 2, which is preferably made integral with the runners. In the middle of said bar is mounted a draft head 3, having holes 4 at various heights for the insertion of the pin of the draft clevis according to the depth at which the implement is to work in the ground.

Upon each runner, near the inner edge thereof, rests an angle-steel bar 5 on which are secured at 6 the front brackets 7—7, holding the ends of a cross bar 8, on which are held adjustably by clamping screws 9, clamp-shaped bearings 10, in which swivel the stems 11 of rearwardly disposed forks 12 in which are pivoted to revolve cutting disks 13, by which the surface full of weed roots is cut into narrow strips. Farther back on the bars 5 are mounted in brackets 14 several shafts 15, on which revolve the hubs 16 of spider-shaped cutters 17 arranged in alternate order on the various shafts, and whose function it is to cut, stir and pulverize the soil for the purpose set forth.

Near the rear end of each bar 5 is secured a small bracket 18, connected by a link 19 to the lower end of a hand lever 20 which is fulcrumed at 21 to a bracket 22 fixed near the rear end of the runner and having a toothed sector 23 in which a finger operated latch 24 mounted on the lever 20 engages and holds the lever in various positions. The vertical flanges of the bars 5 are also connected to the vertical flanges of the runners by links 25, which together with links 19 and sector 23 enables the lever to hold the bars 5 with all brackets and shafts mounted thereon at any desired elevation so that the disks 13 and arms or blades 17 may be held at various depths below the runners or above the ground when driving the machine idle.

It is obvious that a driver's seat may be mounted on the machine, but as the same is common on agricultural machinery I have not shown it.

Having thus described my invention, what I claim is:—

In an agricultural implement a pair of runners, longitudinally disposed bars link-mounted on the runners to swing up and down thereon, a toothed segment fixed near the rear end of each runner, a lever pivoted to each segment and having a finger latch adapted to engage the teeth, a link from each lever to each of the link-mounted bars; brackets fixed upon the latter bars, a series of cross shafts held by their ends in said brackets, a series of alternately arranged toothed members revolving on each shaft, and forward of all of said shafts a cross bar with the bearings 10 adjustably held thereon, swiveling forks in said bearings, the disks 13 in the forks and means for hitching draft appliances at various heights to the implement.

In testimony whereof I affix my signature, in presence of two witnesses.

HANS P. BRUAAS.

Witnesses:
     PETER CONRADSON,
     GEO. R. THOMPSON.